July 12, 1960  F. J. MARY  2,944,494
FIRE-BOXES OPERATING ON ATOMIZED FUEL
Filed Sept. 12, 1956

INVENTOR
FRANCIS JOSEPH MARY
By Linton and Linton
ATTORNEYS

United States Patent Office 2,944,494
Patented July 12, 1960

2,944,494
FIRE-BOXES OPERATING ON ATOMIZED FUEL

Francis Joseph Mary, Paris, France, assignor to Electricite de France, Paris, France, a national French organization Filed Sept. 12, 1956, Ser. No. 609,413

Claims priority, application France Oct. 4, 1955

3 Claims. (Cl. 110—165)

In my copending specification Serial No. 453,583 filed on September 1, 1954, I have described improvements in fire-boxes burning atomized fuel, which improvements consist in suspending inside the combustion chamber of said fire-boxes at least one member which is inwardly cooled by a circuit feeding a suitable fluid and lined outwardly at least over part of its height with a refractory coat. Said fluid is advantageously constituted by air which is sent subsequently into burners so as to form the combustion air.

Among the advantages provided by such an arrangement I should mention the fact that under normal operative conditions, a portion of the pulverulent ashes melts in contact with said suspended member and drops inside a water-filled pit, so as to be recovered in the form of molten ashes which may serve as an industrial by-product. The remainder of the ashes is recovered in a conventional manner inside dust collectors.

My present invention has for its object improvements brought to the above arrangement chiefly with a view to reintroducing and to melting inside the fire-box the pulverulent ashes which have been recovered inside the dust collectors.

To this end, the suspended member or members are designed in accordance with the present invention so as to receive the ashes at their upper ends or in proximity therewith and to project them into the fire-box preferably in the area subjected to the highest temperatures.

According to a feature of the present invention, the suspended member is provided with a central inner channel which opens at the upper end of said member which is provided at a suitable level with a refractory casing having peripheral ports communicating with said central channel.

The central channel is advantageously capped by a mechanical distributor and the peripheral ports open preferably above a dripstone section rigid with the casing of the suspended member or incorporated as part of said casing.

According to a preferred embodiment of the invention, the lower section of the central channel is provided with a shutter controlled by means, such as a pivoted link system and adapted to assume a reciprocating movement in parallelism with the axis of the channel. Said shutter has for its main purpose a reduction in the speed of the ashes as they drop through said peripheral ports.

The above described arrangement shows other advantages beyond those disclosed in my prior copending specification and it allows in particular obtaining a complete combustion of the carbon contained in the total amount of pulverulent ashes which latter are collected in a molten state.

Further features and advantages of the invention will appear in the reading of the following description, reference being made to the accompanying drawing given by way of example and by no means in a limiting sense.

Figure 2:
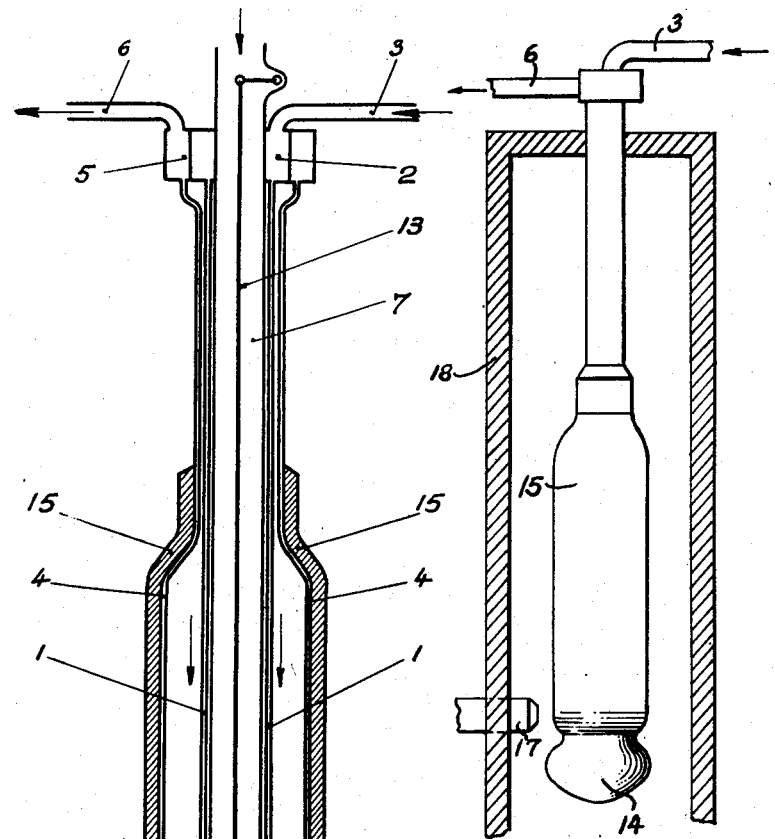
Figure 2 is a diagrammatic view of the present device mounted in a combustion chamber with burner.
Figure 1:
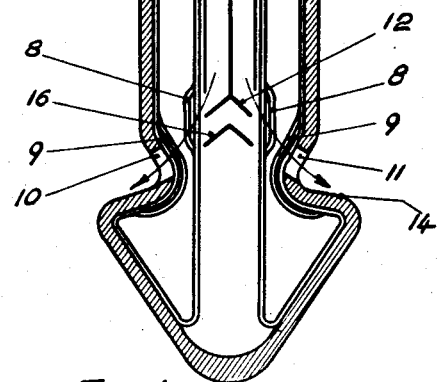
Figure 1 is a longitudinal cross-section of a preferred embodiment of the invention.

In said embodiment a suspended member is shown in which 1 designates the bundle of depending tubes fed with air through a chest 2 by the tube 3 while 4 designates the bundle of tubes returning the air upwardly and opening into the chest 5 which is in its turn connected with the burner 17 extending through a combustion chamber 18 through the pipe 6. The path followed by the air is shown by arrows in the drawing. These two bundles are enclosed inside a refractory casing 15.

On the inside of the bundle 1 is provided an inner axial channel 7 which is fed with pulverulent ashes by a distributor which is not illustrated and is located above the upper end of the chest 2. The bundles 1 and 4 are shifted laterally with reference to those illustrated in my copending above-mentioned specification, as provided by the presence of the inner axial channel 7. The said two bundles are shaped at 8 and 9 in a manner such that they pass along a number of ports 10 and 11 in said refractory casing which provide for communication between the lower end of the inner channel 7 and the outside of said refractory casing. Said inner channel 7 may be closed to a varying extent at its lower end by a shutter 12 controlled by a system of pivotally connected rods 13. Said shutter has for its main action to reduce to a maximum the speed of the ashes dropping down to the ports 10 and 11 and to this end it may assume permanently or otherwise a reciprocating movement in a direction parallel with the axis of the channel 7.

The ports 10 and 11 open above a dripstone 14 forming part of said refractory casing 15. Theres is furthermore provided advantageously a guiding screen 16 for urging the ashes outwardly towards the ports such as 10 and 11.

Generally speaking, the arrangement which has been described operates in the same manner as that which has been described in my copending above mentioned specification.

The ashes which are fed by the central channel pass out of said ports, slide over said dripstone and melt under the action of the heat radiated by the fire-box and of the heat evolved by the combustion of the unburnt particles still contained in the ashes. Said molten ashes flow through gravity over the periphery of said casing and drop into a pit or a slag collector of any suitable type.

Obviously the suspended member designed in accordance with the invention may include any or all of the features appearing in my copending above-mentioned specification.

The embodiment which has just been described has of course been disclosed solely by way of exemplification and it is possible to bring many modifications thereto within the scope of the accompanying claims.

What I claim is:

1. In a combustion chamber for atomized fuel provided with at least one burner, a combustion aid and ash melter comprising an open top refractory casing positioned in the path of the flames from said burner, a channel for receiving pulverulent ashes extending substantially axially through the open top of said casing and therein, means for placing said channel in communication with the exterior lower end of said casing and means for cooling the interior of said casing, a closing member positioned at the lower end of said channel and means for giving said closing member a reciprocating movement in a direction substantially parallel with the longitudinal axis of said channel to alternately throttle and release the lower end of said channel.

2. In combustion chamber for atomized fuel provided with at least one burner, a combustion aid and ash melter comprising an open top refractory casing positioned in the path of the flames from said burner, a channel for receiving pulverulent ashes extending substantially axially through the open top of said casing and therein, means for cooling the interior of said casing, said casing having ports provided in the lower end thereof communicating with the inner end of said channel to provide for the dropping of said pulverulent ashes out of the lower end of said channel through said ports out of said casing, a dripstone connected to said casing beneath said ports serving as an impact surface of said ashes passing out of said ports and over which dripstones said ashes flow in a molten state, a closing member positioned at the lower end of said channel in register with said ports and means for giving said closing member a reciprocating movement in a direction substantially parallel with the longitudinal axis of said channel to alternately throttle and release the path of communication through said ports.

3. In a combustion chamber for atomized fuel provided with at least one burner, a combustion aid and ash melter comprising an elongated open top refractory casing positioned extending downwardly with said combustion chamber in the path of the flames from said burner, a channel member for receiving and passing pulverulent ashes extending substantially axially through the open top of said casing and longitudinally therein, means for cooling the interior of said casing, said casing having ports provided in the lower end thereof communicating with the inner end of said channel member to provide for the dropping of said pulverulent ashes out of the lower end of said channel through said ports out of said casing, and a dripstone connected to said casing beneath said ports serving as an impact surface for said ashes passing out of said ports and over which dripstones said ashes flow in a molten state.

References Cited in the file of this patent

UNITED STATES PATENTS

| | | |
|---|---|---|
| 328,991 | Westlake | Oct. 27, 1885 |
| 652,227 | Heberer | June 19, 1900 |
| 1,452,045 | Hawley | Apr. 17, 1923 |

FOREIGN PATENTS

| | | |
|---|---|---|
| 672,399 | Great Britain | May 21, 1952 |